United States Patent
Min et al.

(10) Patent No.: US 12,076,714 B2
(45) Date of Patent: Sep. 3, 2024

(54) METHOD FOR SEPARATING ORGANOZINC CATALYST FROM POLYALKYLENE CARBONATE POLYMERIZATION SOLUTION

(71) Applicant: LG CHEM, LTD., Seoul (KR)

(72) Inventors: Kyung Min Min, Daejeon (KR); Seung Young Park, Daejeon (KR); Sung Kyoung Kim, Daejeon (KR); Sang Cheol Shin, Daejeon (KR); Won Seok Kim, Daejeon (KR); Won Hee Woo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 594 days.

(21) Appl. No.: 17/437,907

(22) PCT Filed: Sep. 28, 2020

(86) PCT No.: PCT/KR2020/013223
§ 371 (c)(1),
(2) Date: Sep. 10, 2021

(87) PCT Pub. No.: WO2021/066459
PCT Pub. Date: Apr. 8, 2021

(65) Prior Publication Data
US 2022/0143589 A1    May 12, 2022

(30) Foreign Application Priority Data
Sep. 30, 2019    (KR) .................. 10-2019-0120841

(51) Int. Cl.
*B01J 31/12*    (2006.01)
*C08F 6/02*    (2006.01)
*C08G 64/40*    (2006.01)

(52) U.S. Cl.
CPC ............... *B01J 31/12* (2013.01); *C08F 6/02* (2013.01); *C08G 64/40* (2013.01)

(58) Field of Classification Search
CPC ............ B01J 31/12; C08F 6/02; C08G 64/40
(Continued)

(56) References Cited

U.S. PATENT DOCUMENTS 4,960,862 A    10/1990    Carroll et al.
4,981,948 A *  1/1991    Kawachi ............... C08G 64/34
                                                            502/151
(Continued)

FOREIGN PATENT DOCUMENTS

CN      1583825 A      2/2005
CN    102656156 A      9/2012
(Continued)

OTHER PUBLICATIONS

English translation of Written Opinion for PCT/KR2020/013223. (Year: 2021).*

*Primary Examiner* — Patricia L. Hailey
(74) *Attorney, Agent, or Firm* — Bryan Cave Leighton Paisner LLP

(57) ABSTRACT

The present disclosure relates to a method for separating an organozinc catalyst from a polyalkylene carbonate polymerization solution, and the method of the present disclosure includes: stirring and aging a polymerization solution including a polyalkylene carbonate resin, an organozinc catalyst, an alkylene oxide and a polymerization solvent; and filtering the polymerization solution after completing the aging.

11 Claims, 4 Drawing Sheets

(58) Field of Classification Search
USPC ........ 502/102, 170, 343; 210/705, 723, 787, 210/799, 600; 528/196, 198; 423/99, 423/107, 622
See application file for complete search history.

(56) References Cited

U.S. PATENT DOCUMENTS

| | | | |
|---|---|---|---|
| 2003/0013840 A1 | 1/2003 | Ree et al. | |
| 2003/0212280 A1 | 11/2003 | Kahn | |
| 2004/0089613 A1* | 5/2004 | Sorger | C07B 63/04 210/723 |
| 2004/0158032 A1 | 8/2004 | Hinz et al. | |
| 2012/0123066 A1 | 5/2012 | Fujimoto et al. | |
| 2016/0009916 A1* | 1/2016 | Cho | C08J 3/02 524/45 |
| 2016/0194442 A1* | 7/2016 | Kim | B01J 31/12 556/133 |
| 2016/0208080 A1* | 7/2016 | Laemmerhold | C08G 64/34 |
| 2016/0272760 A1* | 9/2016 | Kim | B01J 31/2239 |
| 2017/0226284 A1 | 8/2017 | Sohn et al. | |
| 2018/0305542 A1 | 10/2018 | Lee et al. | |
| 2019/0085121 A1* | 3/2019 | Hofmann | C08G 65/2663 |

FOREIGN PATENT DOCUMENTS

| | | | | |
|---|---|---|---|---|
| CN | 102977230 A | | 3/2013 | |
| EP | 3222348 A1 | * | 9/2017 | ............ B01J 31/16 |
| JP | 11-236443 A | | 8/1999 | |
| JP | 3000064 B2 | | 1/2000 | |
| JP | 2006-506324 A | | 2/2006 | |
| KR | 10-0147818 B1 | | 5/1998 | |
| KR | 10-2002-0028589 A | | 4/2002 | |
| KR | 20020028588 A | | 4/2002 | |
| KR | 10-2002-0050990 A | | 6/2002 | |
| KR | 10-2004-0080467 A | | 9/2004 | |
| KR | 10-2007-0053532 A | | 5/2007 | |
| KR | 10-0871058 B1 | | 11/2008 | |
| KR | 10-2014-0097136 A | | 8/2014 | |
| KR | 10-2016-0052179 A | | 5/2016 | |
| KR | 20160069250 A | * | 6/2016 | ............ C08G 64/34 |
| KR | 10-2016-0131659 A | | 11/2016 | |
| KR | 10-1699575 B1 | | 2/2017 | |
| KR | 10-2017-0106220 A | | 9/2017 | |

* cited by examiner

[FIG. 1]
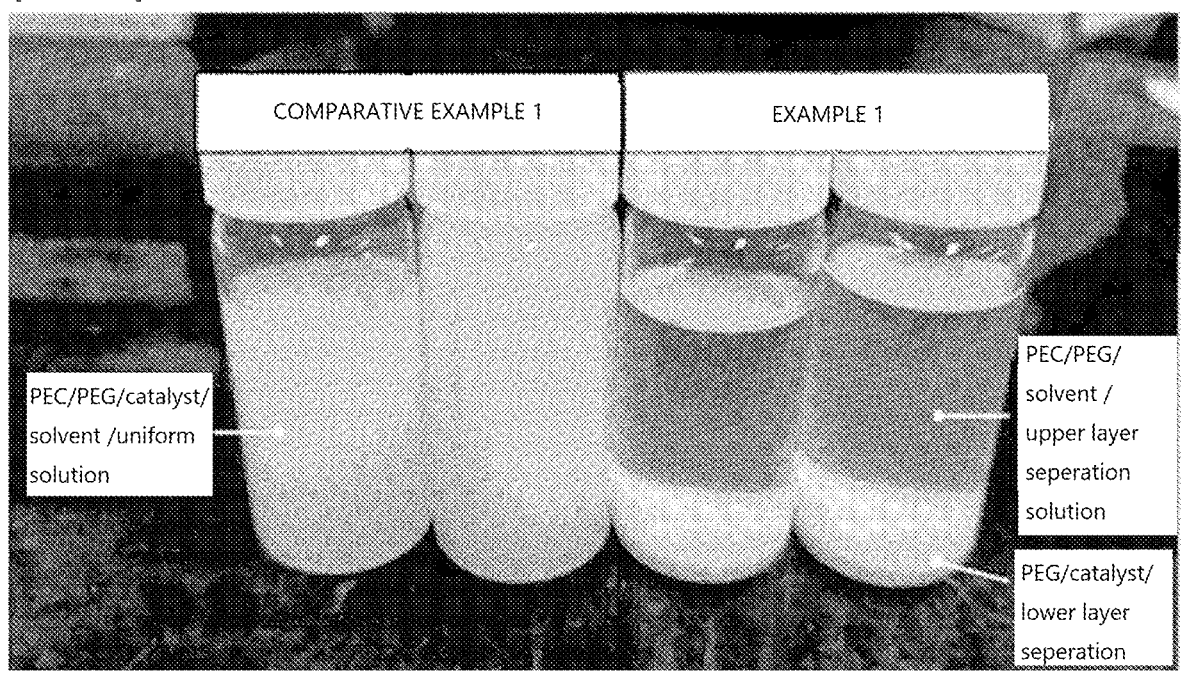

[FIG. 2]
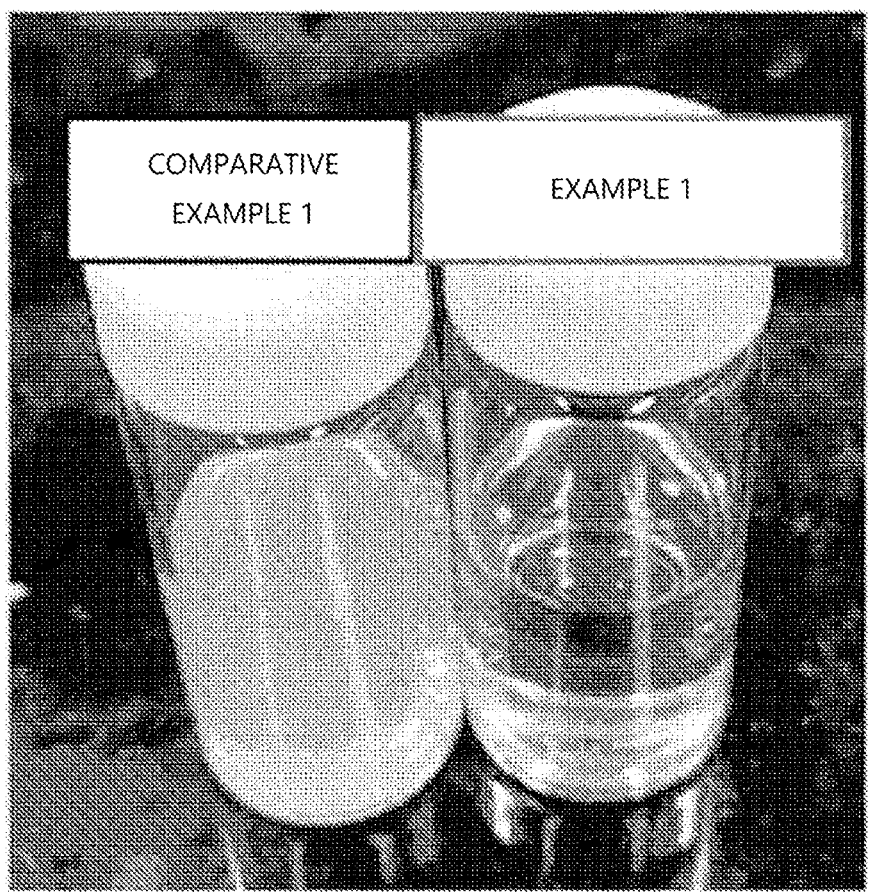

[FIG. 3]
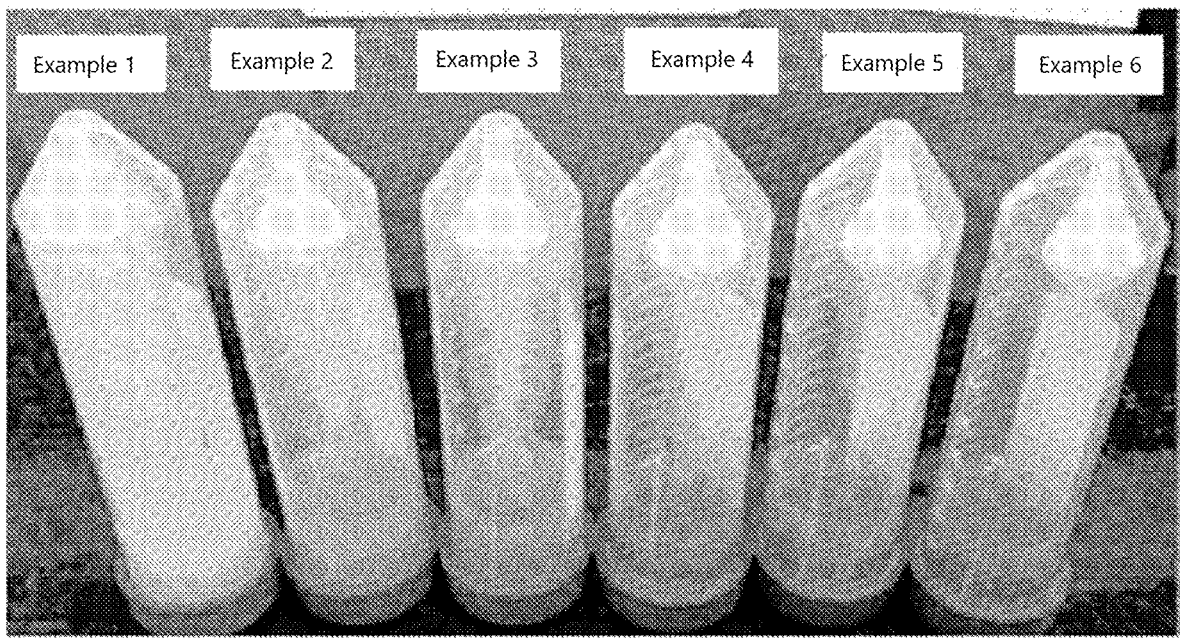

[FIG. 4]
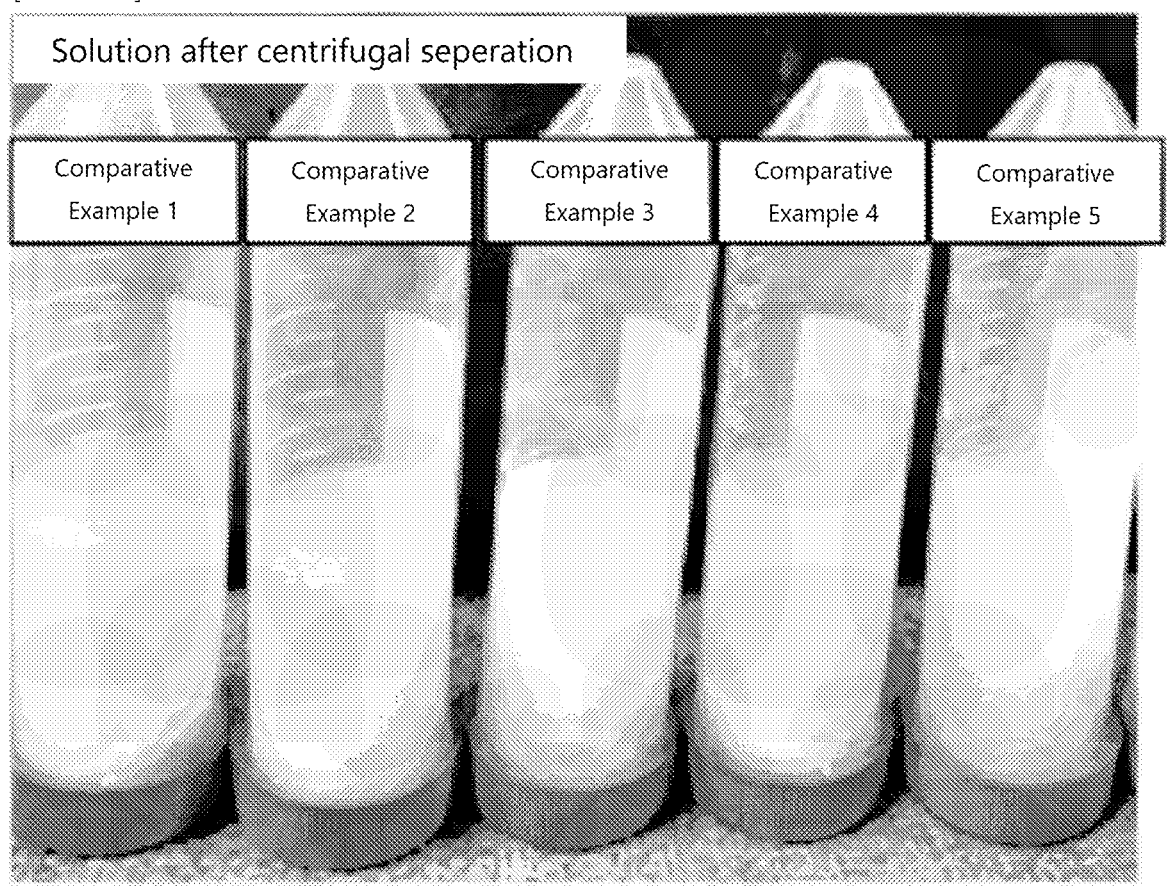

METHOD FOR SEPARATING ORGANOZINC CATALYST FROM POLYALKYLENE CARBONATE POLYMERIZATION SOLUTION

CROSS-REFERENCE TO RELATED APPLICATIONS

The present application is a National Phase entry pursuant to 35 U.S.C. § 371 of International Application No. PCT/KR2020/013223 filed on Sep. 28, 2020, and claims the benefit of and priority to Korean Patent Application No. 10-2019-0120841, filed on Sep. 30, 2019, the entire contents of which are hereby incorporated by reference in their entirety for all purposes as if fully set forth herein.

TECHNICAL FIELD

The present invention relates to a method for separating an organozinc catalyst from a polyalkylene carbonate polymerization solution. More particularly, the present invention relates to a method for easily separating an organozinc catalyst by changing the composition of a polyalkylene carbonate polymerization solution.

BACKGROUND ART

A polyalkylene carbonate resin is a biodegradable resin prepared by polymerization reaction of ethylene oxide (EO) and $CO_2$ in the presence of a catalyst.

As the catalyst used for preparing the polyalkylene carbonate resin, an organozinc catalyst such as a zinc glutarate catalyst in which zinc and dicarboxylic acid are combined, is mostly used.

However, since the organozinc catalyst is uniformly dispersed in a polymerization solution after completing polymerization, it is difficult to separate the organozinc catalyst from a polyalkylene carbonate polymerization solution. Before polymerizing polyalkylene carbonate, the organozinc catalyst is agglomerated, but according to the progress of polymerization, viscosity increases, shear stress increases, the organozinc catalyst is dispersed as minute particles, and polyalkylene carbonate remains on the surface of the catalyst after polymerization to be emulsified and dispersed in a polymerization solution. On this account, the separation of the organozinc catalyst in the polyalkylene carbonate polymerization solution is difficult by using a filter such as a metal filter, a polypropylene fabric filter, and a cellulose filter paper, or by a centrifugal separation method, which are generally used in the removing process of a heterogeneous catalyst.

In order to separate an organozinc catalyst uniformly dispersed in a solution phase, a method for separating an organozinc catalyst by applying silica, a compatible coagulant, and other solvents has been suggested, but there are limits in that the separation efficiency of catalyst particles is not good, and the contamination or decomposition of a finally prepared polyalkylene carbonate is induced.

DISCLOSURE OF THE INVENTION

Technical Problem

The present invention has been devised to solve the above-described problems and provides a method for effectively separating an organozinc catalyst dispersed in a polyalkylene carbonate polymerization solution.

Technical Solution

To solve the problems, the present invention provides a method for separating an organozinc catalyst from a polyalkylene carbonate polymerization solution, comprising: stirring and aging a polymerization solution comprising a polyalkylene carbonate resin, an organozinc catalyst, an alkylene oxide and a polymerization solvent; and filtering the polymerization solution after completing the aging.

Advantageous Effects

In the method for separating an organozinc catalyst of the present invention, a step of aging by stirring a polymerization solution is performed after completing the polymerization of a polyalkylene carbonate resin. In case of performing an aging process as in the present invention, an unreacted alkylene oxide monomer in the polymerization solution is polymerized into a polyalkylene glycol at the surface of the organozinc catalyst. Accordingly, during performing the aging process, the surface of the organozinc catalyst is changed from polyalkylene carbonate-dominant surface to polyalkylene glycol-dominant surface, a catalyst including the polyalkylene glycol is precipitated at the bottom part of the polymerization solution, and as a result, phase separation occurs into an upper layer part including the polyalkylene carbonate resin and the solvent and a lower layer part including the polyalkylene glycol and the catalyst. According to the method of the present invention, a polymerization solution of which phases are separated into the organozinc catalyst and the polyalkylene carbonate resin, could be obtained, and the organozinc catalyst can be easily separated through filtering.

Meanwhile, in case of additionally performing a step of injecting a coagulant after the aging step, the organozinc catalyst is coagulated, and the phase separation is promoted, thereby further improving the separation efficiency of the organozinc catalyst.

In addition, in case of separating the organozinc catalyst according to the method of the present invention, the catalyst can be separated into a chemically unchangeable state, and there are advantages in that the regeneration thereof is possible, and the polymerization solution could be reused without separation.

BRIEF DESCRIPTION OF THE INVENTION

FIG. 1 is a photographic image showing the state of polymerization solutions obtained from Example 1 and Comparative Example 1.

FIG. 2 is a photographic image showing the state of filtered solutions obtained by filtering the polymerization solutions of Example 1 and Comparative Example 1.

FIG. 3 is a photographic image showing the state of polymerization solutions obtained from Examples 1-6.

FIG. 4 is a photographic image showing the state of polymerization solutions obtained from Comparative Examples 1-5.

BEST MODE FOR CARRYING OUT THE INVENTION

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms used herein are for the purpose of describing particular embodiments only and are not intended to limit the present invention. The singular forms are intended to include the plural forms as well, unless the context clearly indicates otherwise.

It will be further understood that the terms "comprising", "having", etc., when used in this specification, specify the presence of stated features, numbers, steps, elements or combinations thereof, but do not preclude the presence or addition of one or more other features, numbers, steps, elements or combinations thereof.

Hereinafter, the present invention will be explained in more detail.

The present invention relates to a method for separating an organozinc catalyst from a polymerization solution used for preparing a polyalkylene carbonate resin, and the method of the present invention includes (1) a step of stirring and aging a polymerization solution including a polyalkylene carbonate resin and an organozinc catalyst, and (2) a step of filtering the polymerization solution after completing the aging.

The present inventors found that if an aging process is performed after completing the polymerization of a polyalkylene carbonate resin, an unreacted alkylene oxide monomer remaining in the polymerization solution of the polyalkylene carbonate resin is additionally polymerized at the surface of an organozinc catalyst during the aging process to form a polyalkylene glycol, and accordingly, the organozinc catalyst is precipitated to arise phase separation, and the polyalkylene carbonate resin and the organozinc catalyst could be easily separated, and completed the present invention.

In the present invention, the polymerization solution is a solution after completing the polymerization of the polyalkylene carbonate resin and removing $CO_2$, and includes a polyalkylene carbonate resin, an organozinc catalyst, an alkylene oxide unreacted reactant and a polymerization solvent. In addition, in the polymerization solution, a polyalkylene glycol which is a reaction by-product can be included.

Generally, in the preparation process of a polyethylene carbonate resin, a conversion ratio of an alkylene oxide reactant into a polyalkylene carbonate is a level of 40-60%. Accordingly, in the polymerization solution, an unreacted alkylene oxide monomer is present in addition to the polyalkylene carbonate resin as a product and of the organozinc catalyst as a catalyst. In this case, the alkylene oxide monomer can be, for example, alkylene oxide of 2 to 20 carbon atoms, particularly, ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, etc.

Meanwhile, the organozinc catalyst can be an organozinc catalyst used for polymerizing a polyalkylene carbonate resin in this technical art, for example, a zinc dicarboxylate-based compound. Particularly, the zinc dicarboxylate-based compound can include a zinc salt of aliphatic dicarboxylate of 3 to 20 carbon atoms or a zinc salt of aromatic dicarboxylate of 8 to 40 carbon atoms. The aliphatic carboxylate of 3 to 20 carbon atoms can be, for example, glutarate, malonate, succinate, or adipate, and the aromatic dicarboxylate of 8 to 40 carbon atoms can be, for example, terephthalate, isophthalate, homophthalate or phenyl glutarate, without limitation. In view of the activity of the organozinc catalyst, the organozinc catalyst can particularly preferably be zinc glutarate.

The organozinc catalyst can include particles having an average particle diameter of 0.5 μm or less and particle diameter standard deviation of 0.04 μm or less. Particularly, the organozinc catalyst can have a uniform particle shape having an average particle diameter of 0.5 μm or less, or 0.1 to 0.4 μm, or 0.2 to 0.4 μm, and particle diameter standard deviation of 0.04 μm or less, or 0.01 to 0.03 μm.

As described above, since the organozinc catalyst has minute and uniform particle diameter, the organozinc catalyst can have a surface area of 1.8 $m^2$/g or more, or 1.8 to 2.5 $m^2$/g. As a result, the contact area of the organozinc catalyst with the reactants can increase during the preparation process of the polyalkylene carbonate resin, and improved activity can be shown.

Meanwhile, as the polymerization solvent, polymerization solvents used for polymerizing a polyalkylene carbonate in this technical field can be used without limitation. For example, the polymerization solvent can be methylene chloride, ethylene dichloride, trichloroethane, tetrachloroethane, chloroform, acetonitrile, propionitrile, dimethyl formamide, N-methyl-2-pyrrolidone, dimethyl sulfoxide, nitromethane 1,4-dioxane, 1,3-dioxolane, hexane, toluene, tetrahydrofuran, methyl ethyl ketone, methylamine ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene and methyl propasol, or a mixture of two or more thereof, without limitation.

In the above-described polycarbonate resin polymerization solution, the organozinc catalyst and the polyalkylene carbonate resin are present in uniformly dispersed type, and the separation thereof is not easy. Accordingly, in the present invention, in order to separate the organozinc catalyst from the polymerization solution, a step of aging while stirring the polymerization solution after completing the polymerization of the polyalkylene carbonate is performed for a certain time. The aging step can be performed at a temperature range of 10° C. to 70° C., and the aging time can be 12 hours or more, preferably, about 12 hours to 144 hours. If the aging temperature and time satisfy the above-described ranges, the polymerization reaction of a polyalkylene glycol at the surface of the organozinc catalyst can be smoothly carried out, and the phase separation of the organozinc catalyst and the polyalkylene carbonate can be achieved well.

If the aging process is performed as described above, the remaining unreacted alkylene oxide monomer in the polymerization solution is polymerized at the surface of the organozinc catalyst to form the polyalkylene glycol. By such additional polymerization reaction, the composition of the surface of the organozinc catalyst is changed from polyalkylene carbonate-dominant into polyalkylene glycol-dominant, and according to the increase of the amount of the polyalkylene glycol formed at the surface of the catalyst, the polyalkylene glycol and the organozinc catalyst are agglomerated and precipitated, thereby inducing phase separation. Accordingly, the polymerization solution after completing the aging can be separated into an upper layer part including the polyalkylene carbonate resin and the polymerization solvent and a lower layer part including the polyalkylene glycol and the catalyst.

Meanwhile, though not essential, in the method of the present invention, a step of injecting a coagulant after the aging step and prior to the filtering step, which will be explained later, can be additionally performed, as necessary. In case of additionally performing the injecting step of the coagulant, the organozinc catalyst can be coagulated, the phase separation of the polymerization solution can be promoted, and the separation efficiency of the catalyst can be improved even further.

In this case, as the coagulant, a solid-state coagulant can preferably be used, for example, polymethyl methacrylate (PMMA), a polymethyl methacrylate copolymer, cellulose, silica, diatomite, activated carbon, guar gum, alumina, aluminum hydroxide, sodium chloride, sodium sulfate, calcium chloride, magnesium sulfate, etc., can be used, without limitation.

Preferably, the polymethyl methacrylate can be used as the coagulant, and in this case, the polymethyl methacrylate can have a weight average molecular weight (Mw) of 50,000 g/mol-200,000 g/mol, preferably, 70,000 g/mol-150,000 g/mol, more preferably, 90,000 g/mol-100,000 g/mol, and a melting index (MI, measurement conditions: 230° C., load of 3.8 kg) of 10 g/10 min-30 g/10 min, preferably, 15 g/10 min-25 g/10 min.

In addition, the coagulant can be injected in an amount of 0.01-10 wt %, preferably, 0.1 to 5 wt %, more preferably, 0.1 to 2 wt % in the polymerization solution. If the amount of the coagulant is too small, the separation efficiency of the catalyst is insignificant, and if the amount is too large, an additional process for separating the coagulant is required, and process efficiency can be reduced.

In addition, the method of the present invention can additionally include a step of performing centrifugal separation of the polymerization solution prior to the filtering step, which will be explained later, as necessary.

The centrifugal separation is for promoting the phase separation of the polymerization solution, and can be performed, for example, with a relative centrifugal force of 100 G to 50,000 G, or 1,000 G to 30,000 G, or 2,000 G to 20,000 G, for 0.1 minutes to 10 minutes, or 0.1 minutes to 5 minutes. The relative centrifugal force is a value in case where a centrifugal force is represented by the ratio with respect to the gravity of the earth and can mean a force applied during performing the centrifugal separation. If the relative centrifugal force is excessively small and less than 100 G, or if the time for performing the centrifugal separation is excessively reduced and less than 0.1 minutes, the coagulating effects of the organozinc catalyst particles can be reduced.

Examples of a particular method for performing the centrifugal separation is not severely limited, and diverse centrifugal separation apparatuses widely used in this technical field can be used, without limitation.

If the phase-separated polymerization solution is obtained by the above-described method, this polymerization solution is filtered to separate the organozinc catalyst from the polyalkylene carbonate resin polymerization solution. In this case, the filtering can be performed by using a commonly used filtering method in this technical field by using a filter such as a polypropylene fabric filter and a cellulose filter paper, and the method is not specifically limited.

According to the method of the present invention, the polyalkylene glycol formed at the surface of the catalyst through the aging step and the organozinc catalyst are mostly coagulated and precipitated, and move toward the lower layer part of the polymerization solution, and at the upper layer part of the polymerization solution, the polyalkylene carbonate resin and the polymerization solvent remain. In case of performing the coagulant injection and/or centrifugal separation steps, such phase separation can be promoted even further.

According to the method of the present invention as described above, the polyalkylene carbonate resin and the organozinc catalyst are present in a separated state through the phase separation, and the organozinc catalyst can be easily separated through filtering.

MODE FOR CARRYING OUT THE INVENTION

Hereinafter, the present invention will be particularly explained through particular embodiments.

Example 1

Carbon dioxide and ethylene oxide were polymerized in the presence of an organozinc catalyst to synthesize a polyalkylene carbonate resin solution.

Then, carbon dioxide was removed from a polymerization reactor, and a polyalkylene carbonate resin including a solvent, a polyalkylene carbonate resin, an organozinc catalyst, etc., as they were, was additionally aged while stirring at 25° C. for one day.

Comparative Example 1

A polyalkylene carbonate resin polymerization solution including a solvent, a polyalkylene carbonate resin and an organozinc catalyst was obtained by the same method as Example 1 except for not performing the aging process.

Experimental Example 1

The states of the polymerization solutions obtained according to Comparative Example 1 and Example 1 were visually inspected. In FIG. 1, a photographic image showing the states of the polymerization solutions of Comparative Example 1 and Example 1 is shown. As shown in FIG. 1, in the solution of Comparative Example 1, which did not undergo an aging process, components are uniformly dispersed without phase separation, but in contrast, in the solution of Example 1, which performed an aging process, phase separation is shown.

In addition, in order to confirm the composition, NMR analysis was conducted on the specimens taken from the polymerization solution of Comparative Example 1, and the upper layer solution and the lower layer solution of the polymerization solution of Example 1. The analysis results are shown in [Table 1] below.

TABLE 1

|  | Comparative Example 1 | Example 1 | |
|---|---|---|---|
|  |  | Upper layer solution | Lower layer solution |
| PEC | 99.84 wt % | 94.55 wt % | 28.44 wt % |
| PEG | 0.16 wt % | 5.45 wt % | 71.56 wt % |

PEC: polyethylene carbonate,
PEG: polyethylene glycol

As shown in [Table 1], it could be confirmed that the polymerization solution of Example 1, which underwent an aging process, showed the high content of polyethylene glycol when compared with Comparative Example 1, and this shows that the polyethylene glycol was additionally polymerized through the aging process.

In addition, it could be confirmed that in the upper layer solution of the polymerization solution of Example 1, polyethylene carbonate is present as a main component, and in the lower layer solution, the polyethylene glycol is present as a main component.

Experimental Example 2

A filter pad of a cellulose material was installed in a filter press changer, and the polymerization solutions of Comparative Example 1 and Example 1 were passed therethrough to perform filtering experiments. The polymerization solutions were injected with a pressure of 7 bar, and the filtered solutions were put in glass vials to compare transparency. In FIG. 2, a photographic image showing the states of the solutions filtered and put in the glass vials is shown. As shown in FIG. 2, it could be confirmed that the solution of Example 1 is transparent after filtering, but the solution of Comparative Example 1 is opaque after filtering, because an organozinc catalyst is not separated but remain.

In addition, in order to check the remaining amount of the catalyst in the filtered solution, the Zn metal content in the filtered solution was measured using an inductively coupled plasma (ICP) apparatus. Measurement results are shown in [Table 2] below.

TABLE 2

|  | Zn content (ppm) |
| --- | --- |
| Example 1 | 40 |
| Comparative Example 1 | 1450 |

As shown in Table 2, the polymerization solution of Example 1, which underwent an aging process showed significantly reduced Zn content in the filtered solution when compared with the filtered solution of the polymerization solution of Comparative Example 1, and according to the method of Example 1, the separation efficiency of an organozinc catalyst is significantly excellent.

Example 2

A polyethylene carbonate resin was prepared and aging was performed by the same method as Example 1. Through NMR analysis on the components of the polymerization solution after aging, the polyethylene glycol content in the polymerization solution was found 1.5 parts by weight based on 100 parts by weight of the polyethylene carbonate.

Then, 0.1 wt % of polymethyl methacrylate (melting index (MI)=23 g/10 min, weight average molecular weight Mw=90,000-100,000 g/mol) was added as a coagulant to the polymerization solution after completing the aging, and centrifugal separation was conducted in a centrifuge with 3000 G for 3 minutes.

Example 3

The same method as Example 2 was performed except for adding 0.2 wt % of polymethyl methacrylate (melting index (MI)=23 g/10 min, weight average molecular weight Mw=90,000-100,000 g/mol) as a coagulant.

Example 4

The same method as Example 2 was performed except for adding 0.3 wt % of polymethyl methacrylate (melting index (MI)=23 g/10 min, weight average molecular weight Mw=90,000-100,000 g/mol) as a coagulant.

Example 5

The same method as Example 2 was performed except for adding 0.4 wt % of polymethyl methacrylate (melting index (MI)=23 g/10 min, weight average molecular weight Mw=90,000-100,000 g/mol) as a coagulant.

Example 6

The same method as Example 2 was performed except for adding 0.5 wt % of polymethyl methacrylate (melting index (MI)=23 g/10 min, weight average molecular weight Mw=90,000-100,000 g/mol) as a coagulant.

Comparative Example 2

A polyethylene carbonate resin was prepared by the same method as Comparative Example 1. Then, 5 wt % of polyethylene glycol having a weight average molecular weight of 200 g/mol was added to a polymerization solution including the polyethylene carbonate resin, and centrifugal separation was conducted in a centrifuge with 3000 G for 3 minutes.

Comparative Example 3

The same method as Comparative Example 2 was performed except for adding polyethylene glycol having a weight average molecular weight of 600 g/mol.

Comparative Example 4

The same method as Comparative Example 2 was performed except for adding polyethylene glycol having a weight average molecular weight of 2,000 g/mol.

Comparative Example 5

The same method as Comparative Example 2 was performed except for adding polyethylene glycol having a weight average molecular weight of 10,000 g/mol.

Experimental Example 3

The states of the solutions obtained from Examples 1-6 and Comparative Examples 1-5 were visually checked. In FIG. 3, a photographic image showing the states of the solutions of Examples 1-6 is shown, and in FIG. 4, a photographic image showing the states of the solutions of Comparative Examples 1-5 is shown.

As shown in FIG. 3, when compared with the solution of Example 1, in which a coagulant was not injected, the transparency of the solutions of Examples 2-6, in which a coagulant was injected, was higher, and it could be confirmed that with the increase of the injection amount of the coagulant, the transparency was improved. This shows that the separating effects of an organozinc catalyst were improved through the injection of a coagulant.

In contrast, as shown in FIG. 4, in case of Comparative Examples 2-5, in which polyethylene glycol was not produced through an aging process, but polyethylene glycol was injected, the solutions were opaque as in Comparative Example 1, and this shows that the organozinc catalyst was in a dispersed state in the polymerization solutions after centrifugal separation. That is, the separating effects of an organozinc catalyst was not achieved by a method of adding polyethylene glycol, without forming polyethylene glycol at the surface of a catalyst through an aging process.

The invention claimed is:

1. A method for separating an organozinc catalyst from a polyalkylene carbonate polymerization solution, the method comprising:
    stirring and aging a polymerization solution comprising a polyalkylene carbonate resin, an organozinc catalyst, an alkylene oxide and a polymerization solvent; and
    filtering the polymerization solution after completing the aging.

2. The method for separating an organozinc catalyst from a polyalkylene carbonate polymerization solution according to claim 1, wherein the aging is performed in a temperature range of 10° ° C. to 70° ° C.

3. The method for separating an organozinc catalyst from a polyalkylene carbonate polymerization solution according to claim 1, wherein the aging is performed for 12 hours or more.

4. The method for separating an organozinc catalyst from a polyalkylene carbonate polymerization solution according to claim 1, wherein a polyalkylene glycol is polymerized at a surface of the organozinc catalyst during the aging.

5. The method for separating an organozinc catalyst from a polyalkylene carbonate polymerization solution according to claim 1, wherein the polymerization solution after completing the aging is phase separated into an upper layer part comprising the polyalkylene carbonate resin and the solvent and a lower layer part comprising a polyalkylene glycol and the organozinc catalyst.

6. The method for separating an organozinc catalyst from a polyalkylene carbonate polymerization solution according to claim 1, further comprising injecting a coagulant after the aging and prior to the filtering.

7. The method for separating an organozinc catalyst from a polyalkylene carbonate polymerization solution according to claim 6, wherein the coagulant is a coagulant of a solid phase.

8. The method for separating an organozinc catalyst from a polyalkylene carbonate polymerization solution according to claim 7, wherein the coagulant is one or more selected from the group consisting of polymethyl methacrylate (PMMA), a polymethyl methacrylate copolymer, cellulose, silica, diatomite, activated carbon, guar gum, alumina, aluminum hydroxide, sodium chloride, sodium sulfate, calcium chloride, and magnesium sulfate.

9. The method for separating an organozinc catalyst from a polyalkylene carbonate polymerization solution according to claim 6, wherein the coagulant is injected in an amount of 0.01-10 wt % in the polymerization solution.

10. The method for separating an organozinc catalyst from a polyalkylene carbonate polymerization solution according to claim 1, further comprising centrifugal separation of the polymerization solution after completing the aging and prior to the filtering.

11. A method for separating an organozinc catalyst from a polyalkylene carbonate polymerization solution, the method comprising:
    stirring and aging a polymerization solution comprising a polyalkylene carbonate resin, an organozinc catalyst, an alkylene oxide and a polymerization solvent until the polymerization solution is phase separated into an upper layer part comprising the polyalkylene carbonate resin and the solvent and a lower layer part comprising a polyalkylene glycol and the organozinc catalyst.

* * * * *